United States Patent

Meszlenyi

[11] Patent Number: 5,612,860
[45] Date of Patent: Mar. 18, 1997

[54] START-UP AND RUNNING CIRCUIT FOR RESONANT TRANSITION POWER CONVERTERS

[75] Inventor: Ivan Meszlenyi, North York, Canada

[73] Assignee: Powerpaq Technologies Inc., Downsview, Canada

[21] Appl. No.: 289,401

[22] Filed: Aug. 12, 1994

[30] Foreign Application Priority Data

Aug. 12, 1993 [CA] Canada .................................. 2103982

[51] Int. Cl.$^6$ ............................................. H02M 7/517
[52] U.S. Cl. ................................................ 363/49; 363/17
[58] Field of Search ................................. 363/49, 17, 59, 363/60, 61, 123, 132, 136

[56] References Cited

U.S. PATENT DOCUMENTS

| | | | |
|---|---|---|---|
| 4,992,919 | 2/1991 | Lee et al. | 363/17 |
| 5,282,126 | 1/1994 | Husgen | 363/49 |
| 5,303,137 | 4/1994 | Peterson | 363/16 |
| 5,452,195 | 9/1995 | Lehr et al. | 363/21 |

FOREIGN PATENT DOCUMENTS 0027422  3/1981  Japan ........................................ 363/49

*Primary Examiner*—Peter S. Wong
*Assistant Examiner*—Adolf Berhane
*Attorney, Agent, or Firm*—Orange & Associates

[57] ABSTRACT

The start-up circuit comprises a large valued resistor and a storage capacitor. A voltage sensing switch is connected to the junction of the resistor and storage capacitor on one hand and a voltage doubler on another. The voltage doubler is fed through a capacitor driven by a pair of switching elements arranged in a bridge configuration. The switching elements are driven by a control circuit which is supplied by the start-up and run circuitry. The output of the bridge feeds a resonant tank which is parallel loaded through the resonant capacitor by means of a transformer.

4 Claims, 4 Drawing Sheets

START-UP AND RUNNING CIRCUIT FOR RESONANT TRANSITION POWER CONVERTERS

BACKGROUND OF THE INVENTION

This invention relates in general to switch mode power supplies, and more particularly to a start-up and running circuit for transition bridge mode converters.

DESCRIPTION OF THE RELATED ART

FIG. 1 is a block-schematic diagram of a conventional resonant mode power converter. Reference numeral 14 represents a power source connected to a large value resistor 1, to a switching element 4, and an upper snubber capacitor 6. Reference numeral 2 denotes a voltage sensing switch with hysteresis which is connected to a control circuit 3 having outputs connected to control inputs of switching elements 4 and 5. A lower snubber capacitor 7 and upper snubber capacitor 6 are connected to one terminal of an inductor 11, the opposite terminal of which is connected to ground via output capacitor 12. Transformer primary winding 15 is connected across the output capacitor 12. A first secondary winding 13 is connected to load 17 while a second secondary winding 18 is connected to a rectifier 8. The cathode of rectifier 8 feeds a storage capacitor 10 which is also connected to resistor 1 and the voltage sensing switch 2.

In operation, at start-up, resistor 1 feed storage capacitor 10 with low current. The moment the voltage on the capacitor reaches a predetermined threshold of the voltage sensing switch 2, the converter begins operating. The voltage produced across the first transformer secondary winding is reduced by means of the second secondary winding 18 and rectified by rectifier 8, which causes self-sustaining operation of the converter.

Transformers are known to be one of the most expensive elements used in isolated power converters. The additional seconding winding 18 in prior art converters contributes to additional cost and complexity of such converters, especially to converters operating off-line.

SUMMARY OF THE INVENTION

It is an object of the present invention to overcome the shortcomings of the prior art converters discussed above. One object of the present invention is to provide a start-up and running circuit that requires no additional windings on the transformer of the converter. Another object of the present invention is to provide such a start-up and running circuit using economical means.

BRIEF DESCRIPTION OF THE DRAWINGS

In drawings which illustrate embodiments of the invention and of the prior art.

DESCRIPTION OF THE PREFERRED EMBODIMENT

Figure 1:
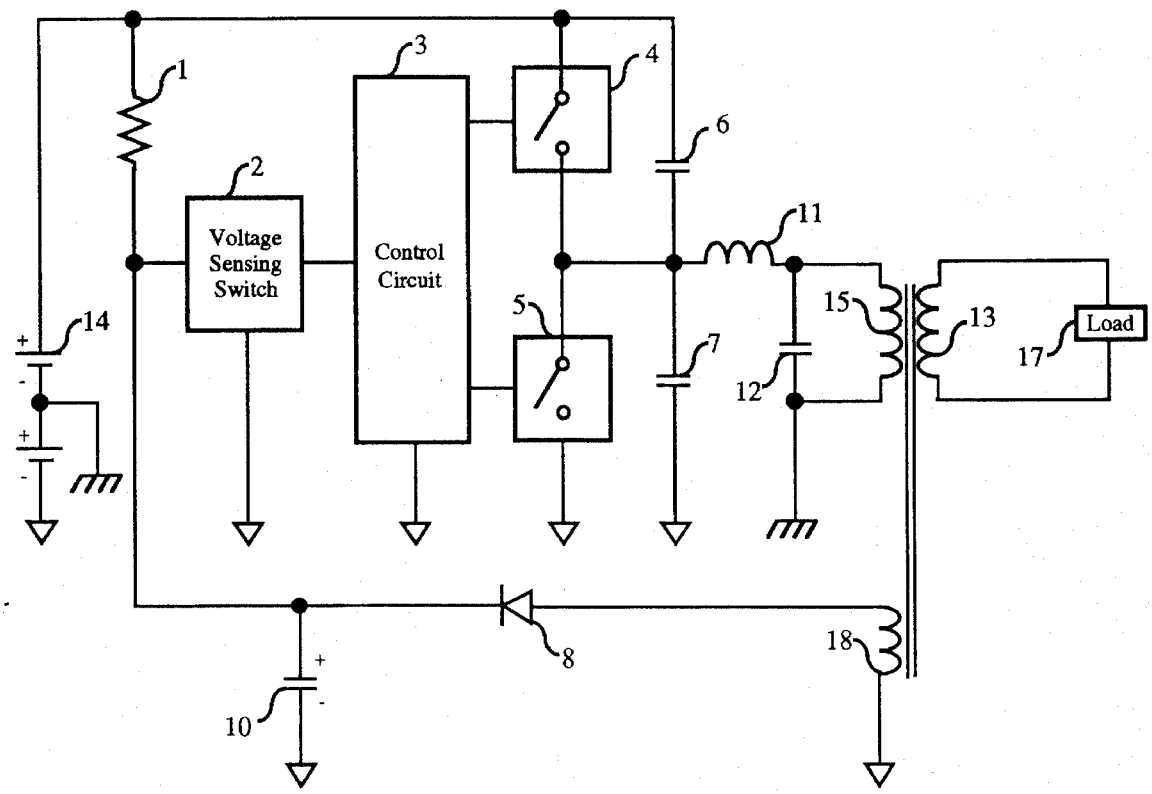
FIG. 1 is a drawing of a conventional start-up and running circuit according to the prior art.
Figure 2:
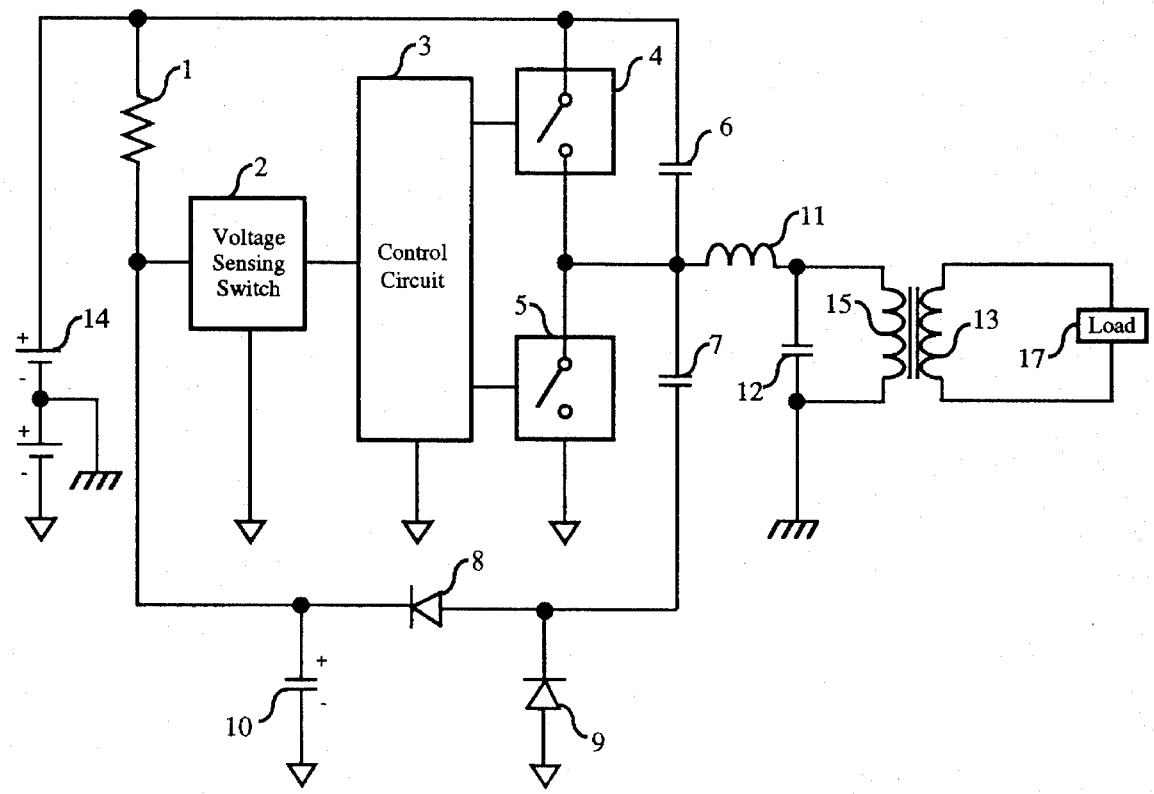
FIG. 2 is a drawing of the circuit according to one embodiment of the present invention.
Figure 4:
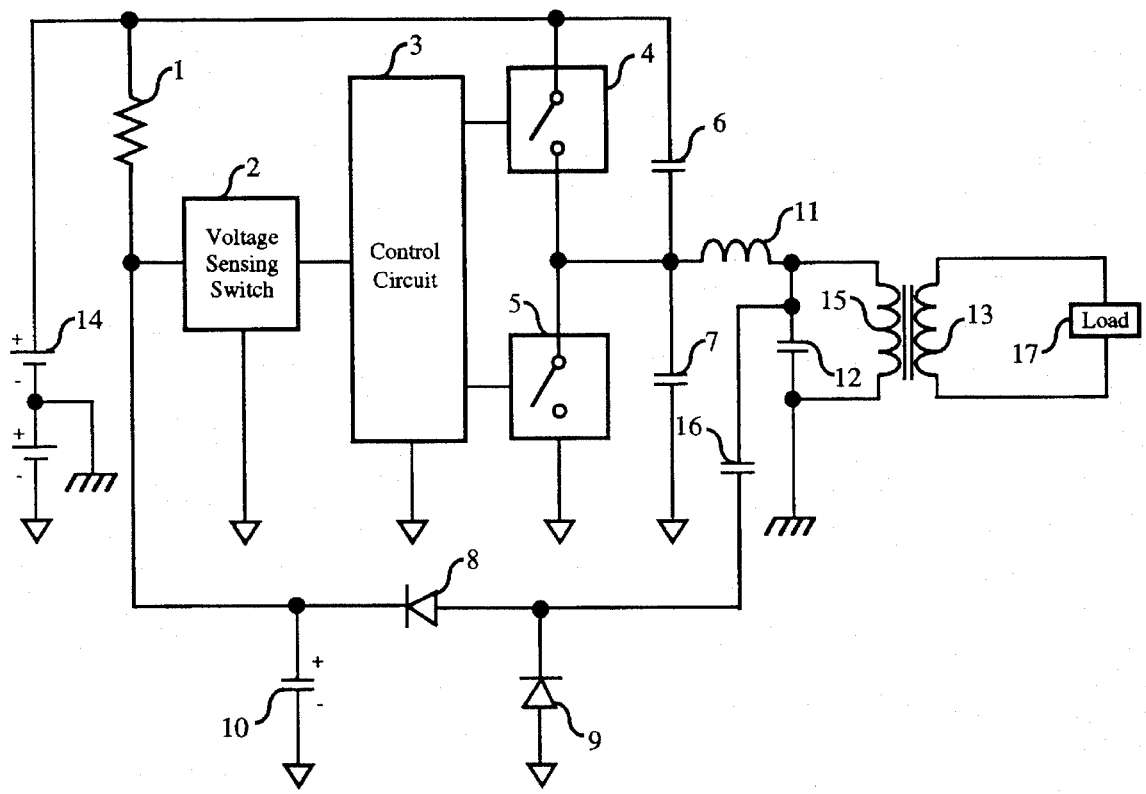
FIG. 4 is a drawing of an alternative embodiment of the circuit according to the present invention.

An embodiment of the present invention is described in detail below with reference to the attached drawings. In FIGS. 2 and 4, the numerals which are identical to the reference numerals appearing in FIG. 1, denote identical circuit elements.

In FIG. 2, a power source 14 is connected to a first terminal of resistor 1 and the upper switching element 4, in the usual manner. The junction of the upper switching element 4 and its lower counterpart 5 drives a resonant tank comprising an inductor 11 and a capacitor 12, to which the primary winding of the transformer is connected in parallel, and which is loaded at the secondary winding 12 by load 17. Two snubber capacitors 6 and 7 are connected to the junction; one capacitor 6 is fed back to the positive power rail and the other capacitor 7, is connected to a voltage doubler which consists of two rectifiers 8 and 9. The rectifiers 8 and 9 are connected to storage capacitor 10, which, in turn is connected to switch 2, thereby supplying operating power to the control circuit 3. The control circuit 3 contains all of the conventional components needed to drive the switching elements 4 and 5.

The operation of this embodiment will be described with respect to FIG. 3 which shows the associated waveforms.

Figure 3A:
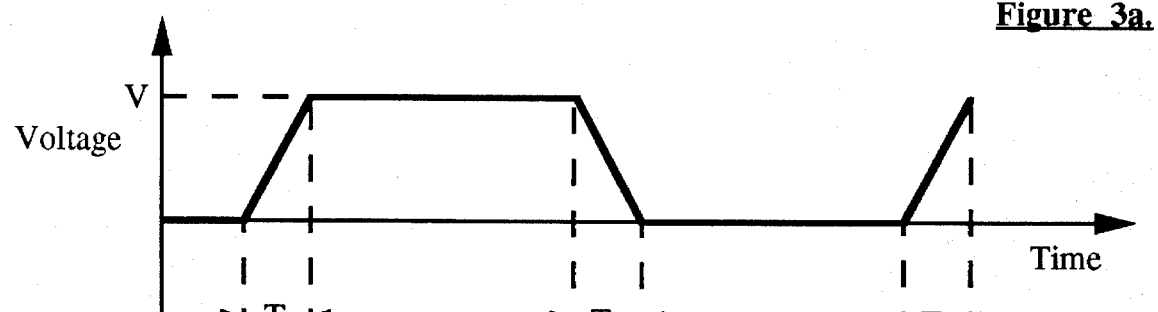
FIG. 3 is a waveform diagram showing the operation of the circuit shown in FIG. 2, wherein (A) shows the voltage waveform as it appears at the junction of the switching elements, (B) shows the current waveform that flows into the voltage doubler, and (C) shows the voltage waveform across the output capacitor.

The waveform shown in FIG. 3A depicts the voltage present at the junction of switching elements 4 and 5. The Rise Time $t_r$, the Fall Time $t_f$, are approximated by the equation:

$$t_f = t_r = K C_s L F \qquad (1)$$

In this equation, $C_s$ is the capacitance value of snubber capacitors 6 and 7 (which does not include output capacitance of switching elements 4 and 5), L is the inductance value of inductor 11, F is the frequency of operation, $F=1/T$, and K is a constant (e.g. 16) for a triangle wave.

Figure 3B:
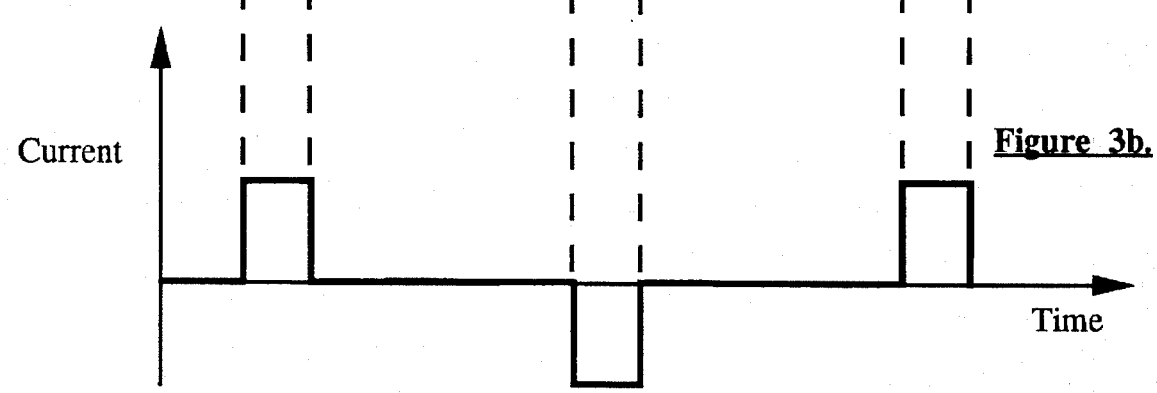
Figure 3C:
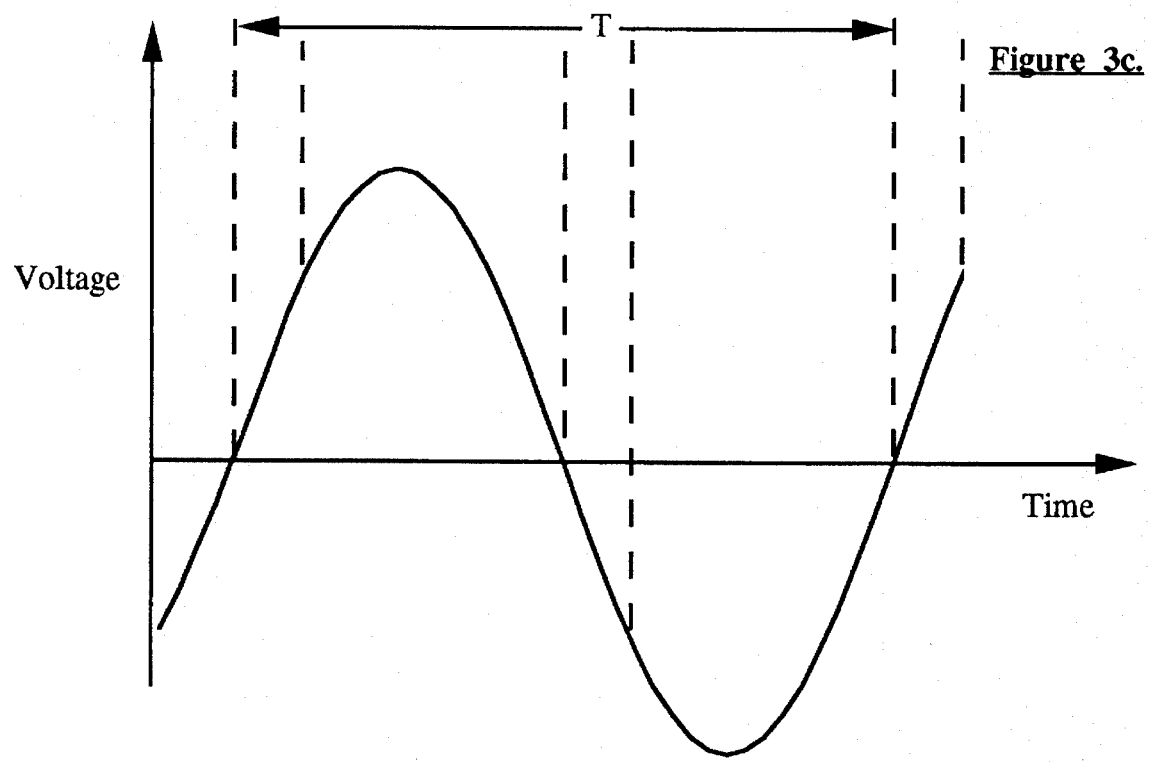

The waveform is FIG. 3B depicts the current flowing through the snubber capacitor 7. The average value of this current is therefore:

$$I_{avg} = C_s \frac{dV}{dt} t_f F \qquad (2)$$

Since $dV=V$ and $dt=t_r=t_f$, then:

$$I_{avg} = C_s V F \qquad (3)$$

where V is the supply voltage of the power source 14 in FIG. 2.

It can be seen that $I_{avg}$ is linearly proportional to frequency F. This is in agreement with drive power requirements for the switching elements 4 and 5, expressed by $$P = 2 C_g V_g^2 F \qquad (4)$$

showing P is also linearly proportional to frequency F, where $C_g$ is the gate capacitance of switching elements 4 and 5 and $V_g$ is the gate voltage.

It can be shown that the actual gate voltage is:

$$V_g = \frac{C_s}{2C_g} V \quad (5)$$

which shows a linear proportionally of $V_g$ with respect to the supply voltage V. Therefore, an input voltage variation of 2 to 1 results in the same rate of change in the gate voltage $V_g$. If the lowest $V_g$ is set to be 10 V, then the maximum $V_g$ will be 20 V at the maximum input. For higher reliability, a zener diode may be employed to limit this voltage.

FIG. 4 shows an alternative embodiment of the present invention for applications in which continuous current limit is not required. In this case, snubber capacitor 7 is connected to ground and another output capacitor 16 feeds the voltage doubler comprising diode 8 and diode 9. For very high loads or short circuits the voltage across the primary winding 15 of the transformer will be reduced below the threshold of the voltage sensing switch 2, resulting in zero current output.

Assuming that $V_g$ is much smaller that V, then the current $I_c$ through coupling capacitor 16 is sinusoidal and the approximate value will therefore be:

$$I_c = V_c 2\pi F C_f \quad (6)$$

where $V_c$ is the voltage on the output capacitor 12 and $C_f$ is the capacitance of the coupling capacitor 16.

Since the relationship of the current $I_c$ through capacitor 16 and frequency F, is that of linear proportionality, then as discussed above with reference to the preferred embodiment of FIG. 2, the same driving power compliance conditions apply as in Equation (4). Since this expression does not imply supply voltage dependence, and since $V_c$ remains relatively constant in a regulated converter, then the driving voltage $V_g$, will be approximately constant (i.e. independent of the load variations within the regulation interval).

For both embodiments illustrated in FIGS. 2 and 4, the basic prior art structure of a resistor 1, a storage capacitor 10 and a voltage sensing switch 2 are incorporated. The moment the voltage on storage capacitor 10 reaches the threshold voltage of the voltage sensing switch 2, the control circuit 3 initiates the required commutation of switching elements 4 and 5 and the waveforms described in FIG. 3 are generated, thereby sustaining the continuous operation of the circuit. However, in contrast with the prior art, the circuit of the present invention eliminates the requirement for a further transformer secondary coil by substituting a low-cost voltage doubler intermediate one of either the lower snubber capacitor 7 and the storage capacitor 10 (FIG. 2), or the coupling capacitor 12 and storage capacitor 10 (FIG. 4).

Although preferred embodiments of the invention have described herein in detail, it will be understood by those skilled in the art that variations may be made thereto without departing form the spirit of the invention or the scope of the appended claims.

I claim:

1. A start-up and running circuit for a switch mode converter connected to a load, comprising:
   a) a pair of switching elements connected at a junction in a bridge mode configuration;
   b) control means for controlling the switching operation of said switching elements;
   c) resonant network means having at least an inductor and an output capacitor;
   d) transformer means having a primary winding and a secondary winding, wherein the primary winding is parallel to said output capacitor and the secondary winding is connected to said load;
   e) snubber capacitor means connected to the junction of said switching elements for generating AC current responsive to operation of said switching elements;
   f) rectifying means including a first rectifier for rectifying the AC current generated by said snubber capacitor means;
   g) storage capacitor means for storing charges corresponding to said AC current rectified by said rectifying means;
   h) resistor means for supplying an initial charge to said storage capacitor means; and
   i) voltage sensing switch means with hysteresis, connected to said resistor means and storage capacitor means for applying power to said control means when the voltage on said storage capacitor means reaches a predetermined threshold voltage.

2. A start-up and running circuit for a switch mode converter connected to a load, comprising:
   a) a pair of switching elements connected at a junction in a bridge mode configuration;
   b) control means for controlling the switching operation of said switching elements;
   c) resonant network means having at least an inductor and an output capacitor;
   d) transformer means having a primary winding and a secondary winding, wherein the primary winding is parallel to said output capacitor and the secondary winding is connected to said load;
   e) snubber capacitor means connected to the junction of said switching elements for generating AC current responsive to operation of said switching elements;
   f) coupling capacitor means connected to the primary winding of said transformer for coupling said AC current;
   g) rectifying means including a first rectifier for rectifying the AC current generated by said coupling capacitor means;
   h) storage capacitor means for storing charges corresponding to said AC current rectified by said rectifying means;
   i) resistor means for supplying an initial charge to said storage capacitor means; and
   j) voltage sensing switch means with hysteresis, connected to said resistor means and storage capacitor means for applying power to said control means when the voltage on said storage capacitor means reaches a predetermined threshold voltage.

3. The circuit of claim 1 wherein said rectifying means includes a second rectifier connected to said snubber capacitor means for forming, in combination with said first rectifier, a voltage doubler.

4. The circuit of claim 2 wherein said rectifying means includes a second rectifier connected to said coupling capacitor means for forming, in combination with said first rectifier, a voltage doubler.

* * * * *